(12) United States Patent
Gantenbein et al.

(10) Patent No.: US 10,519,307 B2
(45) Date of Patent: *Dec. 31, 2019

(54) TREATMENT OF CALCIUM CARBONATE CONTAINING MATERIALS FOR INCREASED FILLER LOAD IN PAPER

(71) Applicant: Omya International AG, Oftringen (CH)

(72) Inventors: Daniel Gantenbein, Basel (CH); Joachim Schoelkopf, Oberkulm (CH); Patrick A. C. Gane, Rothrist (CH)

(73) Assignee: Omya International AG, Oftringen (CH)

( * ) Notice: Subject to any disclaimer, the term of this patent is extended or adjusted under 35 U.S.C. 154(b) by 160 days.

This patent is subject to a terminal disclaimer.

(21) Appl. No.: 15/682,999

(22) Filed: Aug. 22, 2017

(65) Prior Publication Data

US 2017/0369695 A1   Dec. 28, 2017

Related U.S. Application Data

(63) Continuation of application No. 14/396,148, filed as application No. PCT/EP2013/059197 on May 2, 2013, now Pat. No. 9,896,580.

(60) Provisional application No. 61/648,642, filed on May 18, 2012.

(30) Foreign Application Priority Data

May 11, 2012 (EP) ..................... 12167650

(51) Int. Cl.
| | | |
|---|---|---|
| C08L 33/26 | (2006.01) |
| D21H 19/54 | (2006.01) |
| C04B 28/28 | (2006.01) |
| C08L 3/00 | (2006.01) |
| D21H 19/42 | (2006.01) |
| D21H 19/38 | (2006.01) |
| D21H 17/00 | (2006.01) |
| D21H 17/69 | (2006.01) |
| D21H 17/56 | (2006.01) |
| D21H 17/67 | (2006.01) |
| D21H 17/37 | (2006.01) |
| D21H 17/29 | (2006.01) |
| D21H 17/24 | (2006.01) |
| D21H 17/14 | (2006.01) |
| C09D 133/26 | (2006.01) |
| C09D 103/00 | (2006.01) |
| C09C 1/02 | (2006.01) |
| D21H 19/56 | (2006.01) |

(52) U.S. Cl.
CPC .............. *C08L 33/26* (2013.01); *C04B 28/28* (2013.01); *C08L 3/00* (2013.01); *C09C 1/021* (2013.01); *C09D 103/00* (2013.01); *C09D 133/26* (2013.01); *D21H 17/00* (2013.01); *D21H 17/14* (2013.01); *D21H 17/24* (2013.01); *D21H 17/29* (2013.01); *D21H 17/37* (2013.01); *D21H 17/375* (2013.01); *D21H 17/56* (2013.01); *D21H 17/675* (2013.01); *D21H 17/69* (2013.01); *D21H 17/74* (2013.01); *D21H 19/385* (2013.01); *D21H 19/42* (2013.01); *D21H 19/54* (2013.01); *D21H 19/56* (2013.01); *C01P 2004/62* (2013.01); *C01P 2006/12* (2013.01); *C01P 2006/22* (2013.01)

(58) Field of Classification Search
None
See application file for complete search history.

(56) References Cited

U.S. PATENT DOCUMENTS

| | | |
|---|---|---|
| 4,272,297 A | 6/1981 | Brooks |
| 4,892,590 A | 1/1990 | Gill |
| 5,079,280 A | 1/1992 | Yang |
| 5,384,013 A | 1/1995 | Husband et al. |
| 6,077,441 A | 6/2000 | Luke |
| 9,896,580 B2 * | 2/2018 | Gantenbein ............ D21H 17/00 |
| 2007/0266898 A1 | 11/2007 | Gane et al. |
| 2008/0210394 A1 | 9/2008 | Mahr et al. |
| 2009/0020250 A1 | 1/2009 | Kimura et al. |
| 2010/0120948 A1 | 5/2010 | Gane et al. |
| 2010/0186917 A1 | 7/2010 | Simonson |
| 2015/0010458 A1 * | 1/2015 | Buri ................. C02F 1/529 423/430 |

FOREIGN PATENT DOCUMENTS

| | | |
|---|---|---|
| CA | 2037525 | 9/1991 |
| DE | 1543116 A1 | 7/1969 |
| DE | 4411681 A1 | 10/1995 |
| EP | 2505614 A1 | 3/2012 |
| EP | 2505615 A1 | 3/2012 |
| WO | 2006008657 A2 | 1/2006 |

(Continued)

OTHER PUBLICATIONS

Smook, Gary A., Handbook of Pulp and Paper Terminology, Angus Wilde Publications, 1990, p. 314 (Year: 1990).*
International Search Report dated Apr. 7, 2013 for PCT Application No. PCT/EP2013/059197.
Written Opinion of International Searching Authority dated Apr. 7, 2013 for PCT Application No. PCT/EP2013/059197.
U.S. Appl. No. 14/396,148 nonfinal Office action, dated Aug. 5, 2016, 15 pages.

(Continued)

*Primary Examiner* — Dennis R Cordray
(74) *Attorney, Agent, or Firm* — Arrigo, Lee, Guttman & Mouta-Bellum LLP; Harry J. Guttman

(57) ABSTRACT

The present invention concerns a process for preparing self-binding pigment particles from an aqueous suspension of calcium carbonate containing material, wherein an anionic binder and at least one cationic polymer are mixed with the suspension.

32 Claims, 2 Drawing Sheets

(56) References Cited

FOREIGN PATENT DOCUMENTS

WO   2006128814 A1   12/2006
WO   2008139292 A1   11/2008

OTHER PUBLICATIONS

U.S. Appl. No. 14/396,148 Response to nonfinal Office action, dated Nov. 2, 2016, 11 pages.
U.S. Appl. No. 14/396,148 final Office action, dated Mar. 13, 2017, 17 pages.
U.S. Appl. No. 14/396,148 Response to final Office action, dated May 23, 3017, 9 pages.
U.S. Appl. No. 14/396,148 Notice of Allowance, dated Jun. 8, 2017, 11 pages.
U.S. Appl. No. 14/396,148 Notice of Allowance, dated Oct. 26, 2017, 11 pages.
U.S. Appl. No. 14/396,148 (now U.S. Pat. No. 9,896,580 B2), Title: Treatment of Calcium Carbonate Containing Materials for Increased Filler Load in Paper, First Named Inventor: Gantenbein, filed Oct. 22, 2014.

* cited by examiner

TREATMENT OF CALCIUM CARBONATE CONTAINING MATERIALS FOR INCREASED FILLER LOAD IN PAPER

CROSS-REFERENCE TO RELATED APPLICATIONS

This is a continuation of U.S. application Ser. No. 14/396,148, filed Oct. 22, 2014, which is the U.S. National phase of PCT Application No. PCT/EP2013/059197, filed May 2, 2013, which claims priority to European Application No. EP12167650.6, filed May 11, 2012 and U.S. Provisional Application No. 61/648,642, filed May 18, 2012, the contents of which are hereby incorporated by reference.

The invention relates to a process for preparing self-binding pigment particles, to a self-binding pigment particle suspension as well as to a paper product comprising self-binding pigment particles and to the use of the self-binding pigment particle suspension.

Mineral materials and binders are among the main constituents used in the manufacture of numerous products such as paints, paper and plastic materials. Therein, mineral materials contribute mechanical and optical properties, while the binder, generally latex-based and in the form of aqueous suspensions or dispersions, provide the necessary adhesion and cohesion for the respective constituents of the end product to be produced.

In order to avoid the logistic difficulties of handling mineral materials and binders separately, and further to avoid the unwanted physical and chemical interactions developed in comparable mixtures of mineral materials and binders, self-binding pigment particles have been developed and are known to industry. In this regard, self-binding pigment particles having both the properties of the mineral material and of the binder may be directly implemented in a variety of applications. This unique product named self-binding pigment particles refers to distinct, solid particles, formed of mineral material and binder that are intimately bound to one another. The internal cohesion forces are such as to provide the self-binding pigment particles with excellent mechanical stability.

Self-binding pigment particles can be produced from calcium carbonate containing mineral materials, for example, from natural mineral pigment materials which are commonly prepared by a process implementing at least one step of grinding mineral materials in the presence of binder. Grinding refers to an operation leading to a reduction in the particle size, i.e. the mineral materials in the self-binding pigment particles have a smaller diameter than the initial mineral material used to produce them. Such self-binding pigment particles are described in a number of documents, including WO 2006/008657, WO 2006/128814, and WO 2008/139292.

For completeness, the Applicant would like to mention the following applications in its name, which also refer to processes for preparing self-binding pigment particles: unpublished European Patent Applications with filing numbers 11 160 900.4, 11 160 926.9, 11 179 604.1, and 11 179 572.0.

The processes for preparing self-binding mineral pigment particles known in the art are often limited to the preparation or the co-grinding of suspensions having a low solids content. However, the preparation of low solids content suspensions has the disadvantage that the obtained grinding product has to be concentrated before being shipped to other facilities for further processing. During the time and energy consuming concentrating step, very often an undesired loss of polymeric binder is observed, and, additionally, unwanted agglomerates are formed. Furthermore, the prior art processes often lead to a suspension having a high total organic content of the aqueous phase of the ground suspension. Moreover, the addition of dispersant, however, inter alia affects the adsorption of the binder to the particles during co-grinding.

Self-binding pigment particles containing binders that are based on polymers which are derived from natural or renewable resources are a particular point of interest for environmental reasons. However, such self-binding pigment particles are often formed from negatively charged modified polysaccharides, which may be unfavorable for some fields of applications. For example, due to their negative surface charge such pigment particles are difficult to retain during paper production processes. This leads to a high consumption of self-binding pigment particles and additional retention aid during paper production to obtain the desired filler load in the paper.

A further problem, which very often has significant impact on the mechanical and optical properties of papers and paper coatings made from such self-binding pigment particles, is encountered in respect to the binding between the fibres and such self-binding pigment particles. The self-binding pigment particle suspensions often diminish the mechanical and optical properties of the corresponding end products. One reason for this may be the shape of the self-binding pigment particles, which could hamper the interaction between the self-binding pigment particles and the fibres of the paper. Thus, to produce paper articles with well-adjusted mechanical and optical properties, the interaction boundaries between the self-binding pigment particles and the fibres in the paper have to be optimized.

Furthermore, high filler levels in paper are desirable since these would provide the possibility to reduce the amount of wood fibers in the paper. Moreover, papers with high filler content will dry faster, and, as a result, the paper machine can run faster. Consequently, the addition of high levels of filler can reduce paper production costs and can save natural resources. However, such high filler levels often reduce the area of contact between the remaining fibres. As a result, retaining high amounts of filler with a suboptimal shape produces a weaker sheet that can break more easily on the paper machines, size presses, coaters, winders, printing presses, printing machines, or copy machines.

U.S. Pat. No. 5,611,890 relates to a strong, soft filled tissue paper comprising a non-cellulosic particulate filler, wherein said filler comprises 5 to 50 wt.-% of said tissue paper. WO 03/087472 discloses a filler treatment comprising the preparation of swollen starch-latex compositions, and the addition of said compositions to a filler suspension. The use of these treated fillers during papermaking improves filler retention and produces filled papers, where addition of the filler has only a minimal negative effect on strength properties. A papermaking filler material which has been surface treated with a cationic polymer is described in CA 2,037,525. The article "Improvement of paper properties using starch-modified precipitated calcium carbonate filler" of Zhao et al., TAPPI Journal 2005, vol. 4(2), is concerned with commercial precipitated calcium carbonate fillers that have been modified with corn and potato raw starches. These modified fillers were used as papermaking fillers to improve the strength in high filler content papers.

In view of the foregoing, improving the self-binding pigment particle production process remains of interest to the skilled man. It would be especially desirable to provide a process for making self-binding mineral pigment particles, wherein the mineral pigment particles do not have to be co-ground with the binder since milling is a very cost- and time-consuming step. Furthermore, the particle structure of the mineral pigment particles can change during milling and, therefore, the characteristics of the mineral pigment particles may be different after milling. Additionally, it would also be desirable to provide a process for making self-binding pigment particles, which can be applied to mineral pigment suspensions having a high solids content, thus, avoiding an energy and time consuming concentrating step and, e.g., the formation of significant amounts of unwanted agglomerates. Furthermore, it would be desirable to provide self-binding pigment particles that improve the binding between the fibres in papers and paper coatings and the self-binding mineral pigment particles, and, thus, allows for the production of paper articles with well-adjusted mechanical and optical properties. In particular, it is desirable, to provide a process for making self-binding pigment particles, which allow for the provision of a filler material that shows a good retention in paper production processes, and avoids the use of large amounts of retention aids.

The foregoing and other objectives are solved by the subject-matter as defined herein in the independent claims.

According to one aspect of the present invention, a process for preparing self-binding pigment particles is provided, the process comprising the following steps:

a) providing an aqueous suspension comprising at least one calcium carbonate containing material, b) providing at least one acid or acid salt, wherein the anion of the acid or acid salt is capable of forming water-insoluble calcium salts, c) providing an anionic polymeric binder, wherein said binder comprises at least one modified polysaccharide, d) providing at least one cationic polymer, e) mixing the aqueous suspension of step a) with the at least one acid or acid salt of step b), and f) mixing the suspension of step e), the anionic polymeric binder of step c) and the at least one cationic polymer of step d).

According to another aspect, the present invention refers to a self-binding pigment particle suspension which is obtainable by the process according to the present invention.

Another aspect of the present invention refers to the use of the inventive self-binding pigment particle suspension in paper, plastics, paint, coatings, concrete and/or agricultural applications.

Still another aspect of the present invention refers to a paper product comprising the self-binding pigment particles, wherein the particles are at least partially coated with a water-insoluble calcium salt formed from an acid or acid salt, an anionic binder comprising at least one modified polysaccharide, and at least one cationic polymer.

Advantageous embodiments of the inventive method are defined in the corresponding sub-claims.

According to one embodiment in step f) of the inventive process, the suspension obtained by step e) is, in a first step, mixed with the anionic polymeric binder of step c), and then, in a second step, is mixed with the at least one cationic polymer of step d). According to another embodiment in step f) of the inventive process the suspension obtained by step e) is mixed with the anionic polymeric binder of step c) and the at least one cationic polymer of step d) in one step. According to still another embodiment in step f) of the inventive process, the suspension obtained by step e) is, in a first step, mixed with the at least one cationic polymer of step d), and then, in a second step, is mixed with the anionic polymeric binder of step c).

According to one embodiment the suspension obtained by step e) is concentrated before step f). The concentration step can be carried out by using thermal and/or mechanical methods well known to the skilled person.

According to one embodiment the at least one calcium carbonate containing material is selected from calcium carbonate, calcium carbonate containing minerals, mixed calcium carbonate based fillers, or mixtures thereof, preferably the calcium carbonate containing material is calcium carbonate, more preferably precipitated calcium carbonate (PCC) and, most preferably is scalenohedral PCC (S-PCC), rhombohedral PCC (R-PCC), prismatic PCC (P-PCC), cubic PCC (C-PCC), or a mixture thereof. According to another embodiment the at least one calcium carbonate containing material of step a) is provided in form of particles having a weight median particle diameter $d_{50}$ value from 0.1 to 100 μm, preferably from 0.2 to 50 μm, more preferably from 0.5 to 25 μm, and most preferably from 1.0 to 10 μm. According to still another embodiment the at least one calcium carbonate containing material of step a) is provided in form of particles having a specific surface area from 0.1 to 200 $m^2/g$, preferably from 0.5 to 100 $m^2/g$, more preferably from 1.0 to 50 $m^2/g$, and most preferably from 2.0 to 10 $m^2/g$.

According to one embodiment the aqueous suspension of step a) has a solid content from 1 to 99 wt.-%, preferably from 15 to 70 wt.-%, more preferably from 10 to 50 wt.-%, and most preferably from 12 to 40 wt.-%, based on the total weight of the suspension. According to another embodiment the suspension of step a) comprises further minerals such as, talc, kaolin, $TiO_2$, bentonite and mixtures thereof.

According to one embodiment the at least one acid or acid salt of step b) is added in an amount from 0.001 to 40 wt.-%, preferably from 0.005 to 20 wt.-%, more preferably from 0.01 to 10 wt.-%, and most preferably from 0.05 to 5 wt.-%, based on the total weight of the dry calcium carbonate containing material. According to another embodiment the at least one acid or acid salt of step b) is selected from the group comprising citric acid, oxalic acid, phosphoric acid, sulphuric acid, arsenic acid and iodic acid or salts thereof, and mixtures thereof.

According to one embodiment the suspension obtained by step e) has a solid content from 2 to 99 wt.-%, preferably from 10 to 60 wt.-%, more preferably from 15 to 45 wt.-%, and most preferably from 20 to 30 wt.-%, based on the total weight of the suspension.

According to one embodiment the at least one modified polysaccharide is a carboxymethyl derivate and/or a carboxymethyl hydroxypropyl derivate and/or a carboxymethyl hydroxyethyl derivate of a polysaccharide, preferably a carboxymethylcellulose, an anionic guar, an anionic starch, or xanthan gum. According to another embodiment the at least one modified polysaccharide has a degree of substitution of the hydroxyl groups in the range from 0.4 to 2.0, preferably from 0.5 to 1.8, more preferably from 0.6 to 1.6, and most preferably from 0.7 to 1.5.

According to still another embodiment the intrinsic viscosity of the at least one modified polysaccharide is in the range from 5 to 500 ml/g, preferably from 10 to 450 ml/g, more preferably from 50 to 350 ml/g, and most preferably from 100 to 200 ml/g.

According to one embodiment the binder of step c) is in form of an aqueous solution or dry material, preferably in form of a solution having a binder concentration from 1 to 70 wt.-%, preferably from 2 to 55 wt.-%, more preferably from 5 to 50 wt.-%, and most preferably from 30 to 50 wt.-%, based on the total weight of the solution. According to another embodiment the binder of step c) is added in an amount from 0.001 to 20 wt.-%, preferably from 0.005 to 15 wt.-%, more preferably from 0.01 to 10 wt.-%, and most preferably from 0.05 to 5 wt.-%, based on the total weight of the dry calcium carbonate containing material.

According to one embodiment the at least one cationic polymer of step d) is selected from the group comprising polyethyleneimines, polyacrylamides, cationic epichlorohydrin resins, cationic starch, cationic guar, and mixtures thereof. According to still another embodiment the at least one cationic polymer of step d) is in form of a solution or dry material, preferably in form of a solution having a concentration from 0.5 to 70 wt.-%, preferably from 1 to 25 wt.-%, more preferably from 1.5 to 20 wt.-%, and most preferably from 2 to 10 wt.-%, based on the total weight of the solution. According to still another embodiment the at least one cationic polymer of step d) is added in an amount from 0.001 to 20 wt.-%, preferably from 0.005 to 15 wt.-%, more preferably from 0.01 to 10 wt.-%, and most preferably from 0.05 to 5 wt.-%, based on the total weight of the dry calcium carbonate containing material.

According to one embodiment the self-binding pigment particle suspension is used in wet end process of a paper machine, in cigarette paper, board, and/or coating applications, or as a support for rotogravure and/or offset and/or ink jet printing and/or continuous ink jet printing and/or flexography and/or electrophotography and/or decoration surfaces. According to another embodiment the self-binding pigment particle suspension is used to reduce sun light and UV exposure of plant leaves.

According to one embodiment the inventive paper product has a higher tensile index compared to a paper product, wherein the inventive self-binding pigment particles are replaced by the same amount of calcium carbonate containing material particles, preferably the tensile index is at least 5% higher, more preferably at least 7% higher, and most preferably at least 10% higher compared to the tensile index of a paper product, wherein the inventive self-binding pigment particles are replaced by the same amount of calcium carbonate containing material particles.

It should be understood that for the purpose of the present invention, the following terms have the following meaning:

A "suspension" or "slurry" in the meaning of the present invention comprises insoluble solids and water, and optionally further additives, and usually contains large amounts of solids and, thus, is more viscous and can be of higher density than the liquid from which it is formed.

A "calcium carbonate containing material" in the meaning of the present invention can be a mineral material or a synthetic material having a content of calcium carbonate of at least 50 wt.-%, preferably 75 wt.-%, more preferably 90 wt.-%, and most preferably 95 wt.-%, based on the total weight of the calcium carbonate containing material. The term "dry calcium carbonate containing material" is understood to refer to calcium carbonate containing material particles having a total surface moisture content of less than 0.5 wt.-%, preferably less than 0.2 wt.-% and more preferably less than 0.1 wt.-%, based on the total weight of the particles.

"Ground calcium carbonate" (GCC) in the meaning of the present invention is a calcium carbonate obtained from natural sources, such as limestone, marble, calcite or chalk, and processed through a wet and/or dry treatment such as grinding, screening and/or fractionation, for example by a cyclone or classifier.

"Precipitated calcium carbonate" (PCC) in the meaning of the present invention is a synthesized material, generally obtained by precipitation following a reaction of carbon dioxide and calcium hydroxide (hydrated lime) in an aqueous environment or by precipitation of a calcium and a carbonate source in water. Additionally, precipitated calcium carbonate can also be the product of introducing calcium and carbonate salts, calcium chloride and sodium carbonate for example, in an aqueous environment.

An "acid" in the meaning of the present invention is defined as a Brønsted-Lowry acid, that is to say, it is an $H_3O^+$-ion provider. An "acid anion" is defined as a deprotonated form of a $H_3O^+$-ion provider, i.e. it is a conjugated base of an acid. An "acid salt" is defined as an $H_3O^+$-ion provider that is at least partially neutralised by a non-hydrogen cation. A "salt" is defined as an electrically neutral ionic compound formed of anions and non-hydrogen cations. A "salt" may comprise the anhydrous form as well as forms comprising crystal water (hydrate).

For the purpose of the present application, "water-insoluble" materials are defined as materials which require more than 100 ml of water per gram material for dissolving the material at 20° C. as defined by the European Pharmacopoeia. Preferably the materials are dissolved at a pH from 7.5 to 14.

An "anionic polymeric binder" in the meaning of the present invention is defined as a polymer that is capable of binding to the surface of the calcium carbonate containing material and to itself and/or to certain other materials upon drying. The binding includes ionic interactions and/or hydrogen-hydrogen-bridge bonds between the groups on the surface of the calcium carbonate containing material particles and the functional groups of the polymer. Furthermore, the term "anionic polymer" or "anionic polymeric binder" in the meaning of the present invention refers to a polymer having a negative net charge. Said compound is typically modified with anionic groups. The term "anionic" does not exclude the presence of cationic groups provided that the sum of individual charges is negative.

The term "cationic polymer" in the meaning of the present invention refers to a polymer having a net positive charge. Said compound is typically modified with cationic groups. The term "cationic" does not exclude the presence of anionic groups provided that the sum of individual charges is positive.

The "particle size" of the calcium carbonate containing material in the meaning of the present invention is defined by its distribution of particle sizes. The value $d_x$ represents the diameter relative to which x % by weight of the particles have diameters less than $d_x$. This means that the $d_{20}$ value is the particle size at which 20 wt.-% of all particles are smaller, and the $d_{75}$ value is the particle size at which 75 wt.-% of all particles are smaller. The $d_{50}$ value is thus the weight median particle size, i.e. 50 wt.-% of all grains are bigger or smaller than this particle size. For the purpose of the present invention the particle size is specified as weight median particle size $d_{50}$ unless indicated otherwise. For determining the weight median particle size $d_{50}$ value for particles having a $d_{50}$ value from 0.2 and 5 µm, a Sedigraph 5120 device from the company Micromeritics, USA, can be used.

A "specific BET surface area" (SSA) in the meaning of the present invention is defined as the surface area of the mineral pigment divided by the mass of the mineral pigment. As used herein, the specific surface area is measured by nitrogen adsorption using the BET isotherm (ISO 9277: 2010) and is specified in $m^2/g$.

For the purposes of the present invention, the term "viscosity" with reference to coating formulations, refers to Brookfield viscosity. The Brookfield viscosity may be measured by a Brookfield viscometer at 23° C. at 100 rpm and is specified in mPa·s.

The term "intrinsic viscosity" as used in the context of the present invention is a measure of the capability of a polymer in solution to enhance the viscosity of the solution and is specified in ml/g.

The term "degree of substitution" as used in the context of the present invention is specified in respect to the total amount of substituted or modified groups per unmodified monomer unit of the original polysaccharide.

"Modified polysaccharides" in the meaning of the present invention are polysaccharides, wherein at least a part of the hydroxyl groups is carboxylated. Additionally, the modified polysaccharides may contain other modifications such as aldehyde groups.

Where the term "comprising" is used in the present description and claims, it does not exclude other elements. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This, e.g., means that, unless the context clearly dictates otherwise, the term "obtained" does not mean to indicate that, e.g., an embodiment must be obtained by, e.g., the sequence of steps following the term "obtained" even though such a limited understanding is always included by the terms "obtained" or "defined" as a preferred embodiment.

The inventive process for preparing self-binding pigment particles provides several advantages. Firstly, the inventive process provides a good adsorption of the binder to the particle surface and, thus, no additional co-grinding step of the calcium carbonate containing material together with the binder has to be performed. Secondly, the self-binding mineral pigment particles obtained by the inventive process show an improved binding to fibres in paper product processes and, therefore, the filler loaded in the paper can be increased while maintaining the mechanical strength properties of the paper. Additionally, the formation of unwanted aggregates is reduced by applying the inventive process since a subsequent concentrating step can be avoided due to the processing of a high solids content suspension as set out above.

In the following the details and preferred embodiments of the inventive process will be set out in more detail. It is to be understood that these technical details and embodiments also apply to the inventive self-binding pigment particle suspensions and their use.

Step a)

In step a) of the process according to the present invention an aqueous suspension comprising at least one calcium carbonate containing material is provided. According to one embodiment of the present invention, the aqueous suspension is obtained by mixing particles of the calcium carbonate containing material with water.

The calcium carbonate containing material can be selected from calcium carbonate, calcium carbonate containing minerals, mixed carbonate based filler, or mixtures thereof.

According to one embodiment of the present invention, the calcium carbonate containing material is a calcium carbonate. Calcium carbonate may be selected from ground calcium carbonate and/or precipitated calcium carbonate.

Ground (or natural) calcium carbonate (GCC) is understood to be a naturally occurring form of calcium carbonate, mined from sedimentary rocks such as limestone or chalk, or from metamorphic marble rocks. Calcium carbonate is known to exist as three types of crystal polymorphs: calcite, aragonite and vaterite. Calcite, the most common crystal polymorph, is considered to be the most stable crystal form of calcium carbonate. Less common is aragonite, which has a discrete or clustered needle orthorhombic crystal structure. Vaterite is the rarest calcium carbonate polymorph and is generally unstable. Ground calcium carbonate is almost exclusively of the calcitic polymorph, which is said to be trigonal-rhombohedral and represents the most stable of the calcium carbonate polymorphs. The term "source" of the calcium carbonate in the meaning of the present application refers to the naturally occurring mineral material from which the calcium carbonate is obtained. The source of the calcium carbonate may comprise further naturally occurring components such as magnesium carbonate, alumino silicate etc.

According to one embodiment of the present invention the GCC is obtained by dry grinding. According to another embodiment of the present invention the GCC is obtained by wet grinding and subsequent drying.

In general, the grinding step can be carried out with any conventional grinding device, for example, under conditions such that refinement predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill, a pulveriser, a shredder, a de-clumper, a knife cutter, or other such equipment known to the skilled man. In case calcium carbonate containing mineral powder comprises a wet ground calcium carbonate containing mineral material, the grinding step may be performed under conditions such that autogenous grinding takes place and/or by horizontal ball milling, and/or other such processes known to the skilled man. The wet processed ground calcium carbonate containing mineral material thus obtained may be washed and dewatered by well known processes, e.g. by flocculation, filtration or forced evaporation prior to drying. The subsequent step of drying may be carried out in a single step such as spray drying, or in at least two steps. It is also common that such a mineral material undergoes a beneficiation step (such as a flotation, bleaching or magnetic separation step) to remove impurities.

According to one embodiment of the present invention the source of ground calcium carbonate (GCC) is selected from marble, chalk, calcite, dolomite, limestone, or mixtures thereof. Preferably, the source of ground calcium carbonate is selected from marble.

According to one embodiment, the suspension of process step a) comprises one ground calcium carbonate. According to another embodiment of the present invention, the suspension of process step a) comprises a mixture of two or more ground calcium carbonates selected from different sources of ground calcium carbonate. For example, the suspension of at least one ground calcium carbonate may comprise one GCC selected from dolomite and one GCC selected from marble.

According to one embodiment of the present invention, the suspension of process step a) consists of at least one ground calcium carbonate. The suspension of process step a) may consists of one ground calcium carbonate, or may consists of two or more ground calcium carbonates selected from different sources of ground calcium carbonate.

"Precipitated calcium carbonate" (PCC) in the meaning of the present invention is a synthesized material, generally obtained by precipitation following reaction of carbon dioxide and lime in an aqueous environment or by precipitation of a calcium and carbonate ion source in water or by precipitation of calcium and carbonate ions, for example from $CaCl_2$ and $Na_2CO_3$, out of solution. Precipitated calcium carbonate exists in three primary crystalline forms: calcite, aragonite and vaterite, and there are many different polymorphs (crystal habits) for each of these crystalline forms. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC). Aragonite is an orthorhombic structure with typical crystal habits of twinned hexagonal prismatic crystals, as well as a diverse assortment of thin elongated prismatic, curved bladed, steep pyramidal, chisel shaped crystals, branching tree, and coral or worm-like form.

According to a preferred embodiment of the present invention, the calcium carbonate containing material is precipitated calcium carbonate (PCC).

Precipitated calcium carbonate may possess further advantages compared to ground calcium carbonate. For example, contrary to ground calcium carbonate, which is mined from large natural deposits of ore, the PCC particles are prepared synthetically and, therefore, the size and the particle size distribution can be adjusted during preparing. Furthermore, depending on the reaction conditions the shape and crystallinity of the PCC particles can be adjusted. Additionally, PCC mineral pigment particles are not contaminated with impurities and, therefore, may show a better brightness compared to GCC.

Another advantage of PCC is the fact that PCC particles typically have many tips on their outer surface, and thus, are relatively rough. It is believed that these tips of the PPC particles can interlock with paper fibres, resulting in an improved binding between the particles and the fibres. Therefore, the use of PCC as filler in paper application may control the paper structure more optimally, and thus, can improve the mechanical properties of the paper.

According to one embodiment, the suspension of process step a) comprises one precipitated calcium carbonate. According to a preferred embodiment of the present invention, the precipitated calcium carbonate comprises scalenohedral precipitated calcium carbonate (S-PCC).

According to another embodiment of the present invention, the suspension of process step a) comprises a mixture of two or more precipitated calcium carbonates selected from different sources of precipitated calcium carbonate. For example, the suspension of at least one precipitated calcium carbonate may comprise one PCC selected from S-PCC and one PCC selected from R-PCC.

According to another preferred embodiment of the present invention, the suspension of process step a) consists of at least one precipitated calcium carbonate. The suspension of step a) may consist of one type of PCC, or may consist of a mixture of two or more types of PCC.

According to one embodiment of the present invention, the calcium-carbonate containing minerals comprise dolomite.

According to one embodiment, the mixed carbonate based fillers are selected from calcium associated with magnesium and analogues or derivatives, various matter such as clay or talc or analogues or derivatives, and mixtures of these fillers, such as, for example, talc-calcium carbonate or calcium carbonate-kaolin mixtures, or mixtures of natural calcium carbonate with aluminium hydroxide, mica or with synthetic or natural fibers or co-structures of minerals such as talc-calcium carbonate or talc-titanium dioxide or calcium carbonate-titanium dioxide co-structures.

According to another embodiment of the present invention the aqueous suspension comprising the at least one calcium carbonate containing material comprises a further mineral such as talc, kaolin, $TiO_2$, bentonite, or mixtures thereof.

According to a preferred embodiment of the present invention, the at least one calcium carbonate containing material is provided in form of particles having a weight median particle diameter $d_{50}$ from 0.1 to 100 µm, preferably from 0.2 to 50 µm, more preferably from 0.5 to 25 µm, and most preferably from 1.0 to 10 µm.

According to a preferred embodiment of the present invention, the at least one calcium carbonate containing material is provided in form of particles having a specific surface area from 0.1 to 200 m$^2$/g, preferably from 0.5 to 100 m$^2$/g, more preferably from 1.0 to 50 m$^2$/g, and most preferably from 2.0 to 10 m$^2$/g, measured using nitrogen and the BET method according to ISO 9277:2010.

The at least one calcium carbonate containing material is suspended in water, and thus, forms an aqueous suspension or slurry of calcium carbonate containing material. According to one embodiment of the present invention, the aqueous suspension provided in process step a) has a solid content from 1 to 99 wt.-%, preferably from 15 to 70 wt.-%, more preferably from 10 to 50 wt.-%, and most preferably from 12 to 40 wt.-%, based on the total weight of the suspension. The suspension of process step a) can be provided undispersed or dispersed, i.e. the suspension includes a dispersant.

According to a preferred embodiment, the suspension of step a) is undispersed, i.e. it does not contain a dispersant.

Step b)

In step b) of the process according to the present invention at least one acid or acid salt is provided, wherein the anion of the acid or acid salt is capable of forming water-insoluble calcium salts.

According to one embodiment of the present invention, the at least one acid or acid salt is selected from the group consisting of strong acids having a $pK_a$ value of less than or equal to 0 at 25° C., and medium-strong acids having a $pK_a$ value of between 0 and 8, inclusive, and weak acids having a $pK_a$ value of between 8 and 20, inclusive, at 25° C.

According to one embodiment of the present invention, the at least one acid is selected from the group comprising citric acid, oxalic acid, phosphoric acid, sulfuric acid, arsenic acid, and iodic acid.

According to one embodiment of the present invention, the at least one acid is an organic acid selected from the group comprising citric acid and oxalic acid. According to another embodiment of the inventive process, the at least one acid is an inorganic acid selected from the group comprising phosphoric acid, sulfuric acid, arsenic acid and iodic acid.

According to yet another preferred embodiment of the present invention, the at least one acid is a non-polymeric acid that has a molecular weight of less than 1000 g/mol, preferably less than 750 g/mol, and more preferably less than 500 g/mol.

According to another embodiment of the present invention, the at least one acid is liquid at 25° C. and 1 bar. According to another embodiment of the present invention the at least one acid is solid at 25° C. and 1 bar.

According to one embodiment of the present invention, the at least one acid is dissolved in water. According to one embodiment of the present invention the solution of the at least one acid is a low concentrated solution having a concentration of less than 0.1 M.

According to another embodiment of the present invention, the solution of the at least one acid is a highly concentrated solution having a concentration of more than 0.1 M. According to a preferred embodiment of the present invention the solution of the at least one acid has a concentration of about 0.1 M.

An "acid salt" in the meaning of the present invention is defined as an $H_3O^+$-ion provider that is at least partially neutralized by a non-hydrogen cation and, therefore, the "acid salt" comprises at least one "acid anion" and at least one non-hydrogen cation.

According to one embodiment the non-hydrogen cation may possess one positive charged, two positive charges or three positive charges. Cations possessing one positive charge are selected from the group comprising $Na^+$, $K^+$ and $NH_4^+$, cations possessing two positive charges are selected from the group comprising $Mg^{2-}$ and $Sr^{2+}$ and cations possessing three positive charges are selected from the group comprising $Al^{3+}$ and $Fe^{2+}$. Preferably the cation is a sodium cation.

According to one embodiment of the inventive process, said at least one acid salt is selected from the group comprising sodium dihydrogen citrate, potassium dihydrogen citrate, disodium hydrogen citrate, dipotassium hydrogen citrate, trisodium citrate, tripotassium citrate, disodium oxalate, dipotassium oxalate, magnesium oxalate, sodium hydrogen sulfate, sodium potassium sulfate, disodium sulfate, dipotassium sulfate, magnesium sulfate, sodium dihydrogen phosphate, potassium dihydrogen phosphate, disodium hydrogen phosphate, dipotassium hydrogen phosphate, trisodium phosphate and tripotassium phosphate.

According to a preferred embodiment, the at least one acid salt is trisodium citrate.

According to one embodiment of the present invention the at least one acid salt is provided in form of a solution. According to one embodiment of the present invention, the at least one acid salt is dissolved in water. According to another embodiment of the present invention the at least one acid salt is dissolved in an organic solvent, preferably selected from the group comprising, methanol, ethanol, acetone, and mixtures thereof. If the acid salt is provided in form of a solution, the solution is preferably prepared in that the acid salt is added to a solvent, preferably water, having a temperature of at least 1° C., preferably from 20° C. to 100° C., more preferably from 25° C. to 80° C. and most preferably from 30° C. to 60° C.

In one preferred embodiment, the acid salt is added to water at about room temperature, i.e. at a temperature from 20° C.±2° C.

According to one embodiment of the present invention the solution of the at least one acid salt is a low concentrated solution having a concentration of less than 0.1 M, preferably of less than 0.05 M, and more preferably of less than 0.025 M. According to another embodiment of the present invention the solution of the at least one acid salt is a highly concentrated solution having a concentration of more than 0.1 M, preferably of more than 0.2 M and more preferably of more than 0.5 M. According to a preferred embodiment of the present invention the solution of the at least one acid salt has a concentration of about 0.1 M.

According to an alternative embodiment, the acid salt is provided in dry form, e.g. in form of a dry powder.

According to one embodiment of the inventive process, the at least one acid or acid salt is added in an amount from 0.001 to 40 wt.-%, preferably from 0.005 to 20 wt.-%, more preferably from 0.01 to 10 wt.-% and most preferably from 0.05 to 5 wt.-%, based on the total amount of the dry calcium carbonate containing material.

Step c)

In step c) of the process according to the present invention an anionic polymeric binder is provided, wherein said binder comprises at least one modified polysaccharide.

"Modified polysaccharides" in the meaning of the present invention are polysaccharides, wherein at least a part of the hydroxyl groups is carboxylated.

Additionally, the modified polysaccharides may contain other modifications such as aldehyde groups.

Modified polysaccharides according to the present invention may comprise the following structure:

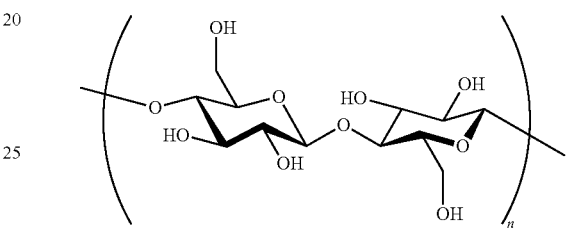

wherein a part of the hydroxyl groups is carboxylated and "n" is indirectly represented by the intrinsic viscosity.

Polysaccharides are polymeric carbohydrate structures, formed of repeating units (at least 10) joined together by glycosidic bonds. Depending on the spatial arrangement of the glycosidic bonds, one may distinguish between α- and β-glycosidic bonds. These structures may be linear, but may also contain various degrees of branching. Polysaccharides may also contain slight modifications of the repeating unit. Exemplary polysaccharides are starch, cellulose, or glycogen, but also structural polysaccharides such as cellulose and chitin.

According to one embodiment of the present invention, the at least one modified polysaccharide has a degree of substitution of the hydroxyl-groups in the range from 0.4 to 2.0, preferably from 0.5 to 1.8, more preferably from 0.6 to 1.6, and most preferably from 0.7 to 1.5.

According to one embodiment of the present invention, the modified polysaccharide is a carboxymethyl derivate and/or a carboxymethyl hydroxypropyl derivate and/or a carboxymethyl hydroxyethyl derivate of a polysaccharide. For example, the modified polysaccharide can be a carboxymethylcellulose (CMC), an anionic starch, an anionic guar, xanthan gum, or mixtures thereof.

According to a preferred embodiment of the present invention, the at least one modified polysaccharide is carboxymethylcellulose (CMC).

Carboxymethylcellulose (CMC) may be prepared from cellulose by reaction with monochloroacetic acid in the presence of caustic soda to form the sodium salt of carboxymethylcellulose. Each repeating D-glycose unit contains three hydroxyl groups capable of etherification, to give a maximum charge density of three carboxylic groups per monomer unit (i.e. a degree of substitution of three).

The molecular weight and the intrinsic viscosity of the carboxymethylcellulose-based binder materials can be adjusted by any method that is known to the person skilled in the art, e.g., by addition of peroxides. Reference is made to DE 1 543 116 A1 describing a method for the preparation of low viscous, water-soluble CMC by oxidative degradation with $H_2O_2$ and to DE 44 11 681 A1 describing the dependency of the degradation of polysaccharide ether on the amount of oxidizing agent, temperature and duration of the treatment.

According to a preferred embodiment of the present invention, the carboxymethylcellulose has an intrinsic viscosity in the range from 5 to 500 ml/g, preferably from 10 to 450 ml/g, more preferably from 50 to 350 ml/g and most preferably from 100 to 200 ml/g.

According to another preferred embodiment of the present invention, the at least one modified polysaccharide is an anionic starch.

The anionic starch is preferably chemically modified with anionic groups selected from the group comprising carboxyl groups, carboxymethyl groups, carboxymethyl hydroxypropyl groups, carboxymethyl hydroxyethyl groups, phosphate groups, sulfonate groups and mixtures thereof. The anionic starch can be chosen from amongst the chemically modified starches originating from starches selected from the group comprising wheat starch, corn starch, rice starch, potato starch, tapioca starch, maranta starch, sorghum starch and mixtures thereof. The anionic starch can also be obtained from genetically modified sources comprising amylopectin enriched starches. In one preferred embodiment, the anionic starch is selected from those enriched in amylopectin, that is to say the chemically modified starch is preferably selected from the group consisting of rice starch, potato starch, and mixtures thereof. Methods for preparing such anionic starches are known by the skilled person. The molecular weight of the anionic starch can range from 1 000 to 1 000 000 g/mol and is generally about 220 000 g/mol. The molecular weight of the anionic starch can be adjusted by the treatment with hydrogen peroxide ($H_2O_2$).

According to another preferred embodiment of the present invention, the at least one modified polysaccharide is an anionic guar.

Guar comprises a natural heteropolysaccharide (guaran) consisting of galactose units and mannose units usually in the ratio of 1:2 and is the endosperm component of guar seeds. In general, guar comprises a linear chain of 1,4-linked β-D-mannopyranosyl units with 1,6-linked α-D-galactopyranosyl units. Guar seeds containing about 14 to 17 wt.-% husk, 35 to 42 wt.-% endosperm and 43 to 47 wt.-% embryo, are usually dry-milled and screened to separate out the endosperm which is the industrial guar of commerce. A guar derivative can be obtained, for example, by modifying the heteropolysaccharide through the use of enzymes, acids, oxidation media, temperature, radiation etc. Methods for preparing such guar derivatives are known to the skilled person. For example, a modification may be obtained by the use of a commercially available α-D-galactosidase enzyme which is useful to remove α-D-galactopyranosyl units. By controlling the length of time that the guaran is exposed to the α-D-galactosidase enzyme, the extent of removal of α-D-galactopyranosyl units from the linear chain of mannose units can be controlled. Additionally or alternatively, a modification of guar may be obtained by etherification of guar with propyleneoxide or ethyleneoxide resulting in a hydroxypropyl guar or hydroxyethyl guar.

According to one embodiment of the present invention, the anionic guar is a carboxymethyl guar (CMG) and/or a carboxymethyl hydroxypropyl guar (CMHEG) and/or a carboxymethyl hydroxyethyl guar (CMHEG). For example, carboxymethyl guar is obtained by reacting a guar with monochloroacetic acid in the presence of caustic soda.

According to one embodiment of the present invention, the anionic polymeric binder of process step c) comprises one modified polysaccharide. According to another embodiment of the present invention, the anionic binder of process step c) comprises two or more modified polysaccharides. According to a preferred embodiment of the present invention, the anionic polymeric binder of process step c) consists of at least one modified polysaccharide. The anionic polymeric binder of process step c) may consist of one type of modified polysaccharide, or may consist of a mixture of two or more types of modified polysaccharides.

According to one embodiment of the present invention, the anionic polymeric binder employed in the process according to the present invention has a pH from 4.5 to 12, preferably from 7 to 11, and more preferably from 8.0 to 10.5.

The anionic polymeric binder can be provided as solution or dry material. According to a preferred embodiment, the anionic polymeric binder is in form of an aqueous solution.

According to a preferred embodiment of the present invention, the anionic polymeric binder is in form of an aqueous solution having a binder concentration from 1 to 70 wt.-%, preferably from 2 to 55 wt.-%, more preferably from 5 to 50 wt.-%, and most preferably from 30 to 50 wt.-%, based on the total weight of the solution.

The modified polysaccharide solution can be concentrated, for example, by ultrafiltration or thermal or drying. Dry modified polysaccharide is preferably produced by thermal drying, more preferably by spray drying and has a solids content of more than 90, preferably from 95 to 99.9 wt.-%, based on the total weight of the modified polysaccharide.

According to one embodiment of the present invention the binder of step c) is added in an amount from 0.001 to 20 wt.-%, preferably from 0.005 to 15 wt.-%, more preferably from 0.01 to 10 wt.-%, and most preferably from 0.05 to 5 wt.-%, based on the total weight of the dry calcium carbonate containing material.

According to a preferred embodiment of the present invention, the anionic binder of step c) is at least one carboxymethylcellulose added in an amount from 0.05 to 5 wt.-%, preferably from 0.1 to 2.5 wt.-%, based on the total weight of the dry calcium carbonate containing material.

Step d)

In step d) of the process according to the present invention at least one cationic polymer is provided.

The inventors of the present application surprisingly found that the addition of at least one cationic polymer can lead to a better retention of the self-binding pigment particles during paper production processes. Without being bound to any theory, it is believed that the anionic charge of the anionic polymer binder is at least partially neutralized by the cationic polymer.

The inventors also found that the addition of at least one cationic polymer can reduce the amount of free polymer in the obtained self-binding pigment particles suspension. Without being bound to any theory, it is believed that the cationic polymer can improve the adhesion or adsorption of the anionic binder and/or the at least one cationic polymer on the ground calcium carbonate particles. This finding was very surprising since it is known that the dispersion of ground calcium carbonate with cationic starch can result in pigment particle suspension containing high amounts of free polymer.

Furthermore, the inventors surprisingly found that the self-binding properties of the pigment particles are also improved. As a result, paper products comprising the inventive self-binding particles as filler material exhibit an improved strength, and also allow the production of papers with high content of filler material. Another advantage is that the physical and optical properties of paper comprising the inventive self-binding pigment particles as filler material are not impaired to any substantial degree.

According to one embodiment of the present invention, the at least one cationic polymer is selected from polyamines, polyethyleneimines, polyacrylamides, cationic epichlorohydrin resins, polydiallyldimethylammonium chloride, cationic starch, cationic guar, or mixtures thereof.

According to one embodiment of the present invention, the at least one cationic polymer is a polyamine, preferably a polyethyleneimine (PEI) being selected from the group comprising branched polyethyleneimines, linear polyethyleneimines and mixtures of the foregoing. Preferably, the ratio of primary, secondary and tertiary amine functions in the inventive branched polyethyleneimines is in the range of 1:0.86:0.42 to 1:1.20:0.76, prior to a possible modification of the branched polyethyleneimines.

According to one preferred embodiment of the present invention, the at least one polyethyleneimine is selected from the group of modified and unmodified polyethyleneimines. Examples for suitable polyethyleneimines are homopolymers of ethyleneimine (aziridine) or its higher homologues and also the graft polymers of polyamidoamines or polyvinylamines with ethyleneimine or its higher homologues. The polyethyleneimines can be crosslinked or uncrosslinked, quaternized and/or modified by reaction with alkylene oxides, dialkyl or alkylene carbonates or $C_1$-$C_8$-carboxylic acids. The polyethyleneimines may be modified by reaction with alkylene oxides such as ethylene oxide, propylene oxide or butylene oxide, dialkyl carbonates such as dimethyl carbonate and diethyl carbonate, alkylene carbonates such as ethylene carbonate or propylene carbonate, or $C_1$-$C_8$-carboxylic acids. Modified PEIs can include alkoxylated polyethyleneimines such as propoxylated polyethyleneimines (PPEIs) and ethoxylated polyethyleneimines (EPEIs). Further preferred modified polyethyleneimines can be obtained by reacting the unmodified PEIs with one or more $C_1$-$C_{28}$-fatty acids, preferably with one or more $C_6$-$C_{18}$-fatty acids and especially preferred with $C_{10}$-$C_{14}$-fatty acids, like, e.g., coconut fatty acid.

The polyethyleneimine can have a weight average molecular weight $M_w$ in the range of 1 000 g/mol and 1 000 000 g/mol. In another preferred embodiment of the present invention the polyethyleneimine is selected from the group of linear polyethyleneimines having a weight average molecular weight $M_w$ from 100 to 700 g/mol, and preferably from 146 to 232 g/mol, and preferably is selected from triethylenetetramine, pentaethylenehexamine and tetraethylenepentamine. According to another preferred embodiment the polyethyleneimine is selected from the group of branched polyethyleneimines having a weight average molecular weight $M_w$ from 500 to 8 000 g/mol and preferably from 800 to 1 200 g/mol.

According to one embodiment of the present invention, the at least one cationic polymer is a cationic starch.

The cationic starch is preferably chemically modified with cationic groups selected from the group comprising amino groups, immonium groups, ammonium groups, sulfonium groups, phosphonium groups, and mixtures thereof. The cationic starch can be chosen from amongst the chemically modified starches originating from virtual any natural sources providing for starch in reasonable amounts. For example, the cationic starch can be chosen from amongst the chemically modified starches originating from starches selected from the group comprising wheat starch, corn starch, rice starch, potato starch, tapioca starch, maranta starch, sorghum starch and mixtures thereof. In one preferred embodiment, the cationic starch is selected from those enriched in amylopectin, that is to say the chemically modified starch is preferably selected from the group consisting of rice starch, potato starch, and mixtures thereof. The cationic starch can also be obtained from genetically modified sources comprising amylopectin enriched starches. Methods for preparing such cationic starches are known by the skilled person. The molecular weight of the cationic starch can range from 1 000 to 1 000 000 g/mol and is generally about 220 000 g/mol. The molecular weight of the cationic starch can be adjusted by the treatment with hydrogen peroxide ($H_2O_2$).

According to another embodiment of the present invention, the at least one cationic polymer is a cationic guar.

Guar comprises a natural heteropolysaccharide (guaran) consisting of galactose units and mannose units usually in the ratio of 1:2 and is the endosperm component of guar seeds. In general, guar comprises a linear chain of 1,4-linked β-D-mannopyranosyl units with 1,6-linked α-D-galactopyranosyl units. Guar seeds containing about 14 to 17 wt.-% husk, 35 to 42 wt.-% endosperm and 43 to 47 wt.-% embryo, are usually dry-milled and screened to separate out the endosperm which is the industrial guar of commerce. A guar derivative can be obtained, for example, by modifying the heteropolysaccharide through the use of enzymes, acids, oxidation media, temperature, radiation etc. Methods for preparing such guar derivatives are known to the skilled person. For example, a modification may be obtained by the use of a commercially available α-D-galactosidase enzyme which is useful to remove α-D-galactopyranosyl units. By controlling the length of time that the guaran is exposed to the α-D-galactosidase enzyme, the extent of removal of α-D-galactopyranosyl units from the linear chain of mannose units can be controlled. A cationic guar can be obtained by reacting guar with derivatives of quaternary ammonium salts.

According to still another embodiment of the present invention, the at least one cationic polymer is polydiallyldimethylammonium chloride (polyDADMAC).

PolyDADMAC (polydiallyldimethylammonium chloride) is a linear homopolymer of diallyldimethylammonium chloride (DADMAC) having the following structure:

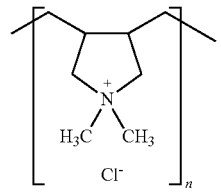

The linear homopolymer formed from a monomer that has a quaternary ammonium and two unsaturated —CH=$CH_2$ functionalities is polymerized by free-radical polymerization of the DADMAC. In the polyDADMAC structure quaternary ammonium groups are on rings that are included in the backbone of the polymer chain. This composition means that the polyDADMAC macromolecules tend to be quite stiff, having a longer persistence length than, for instance, polyamines. For this reason, polyDADMAC is expected to have a more extended conformation in solution. The polyDADMAC can have a weight average molecular weight $M_w$ in the range from 10 000 to 1 000 000 g/mol and preferably in the range from 100 000 to 500 000 g/mol.

Further examples of cationic polymer that are suitable for the process of the present invention are polyacrylamides, or cationic epichlorohydrin resins.

According to an exemplary embodiment, the polyacrylamides include monomers of dialkylaminoethyl(meth)acrylates, dialkylaminoethyl(meth)acrylamides, dialkylaminomethyl(meth)acrylamides, and dialkylamino-1,3-propyl (meth)acrylamides, preferably copolymerized with nonionic monomers, preferably arylamide.

According to another embodiment, the cationic epichlorohydrin resins are copolymers comprising as the monomer one or more dicarboxylic acids and one or more monomers from the group of diamines, triamines, dialkanolamines or trialkanolamines and epichlorohydrin.

Preferably saturated or unsaturated, branched or unbranched $C_2$-$C_{10}$ dicarboxylic acids, preferably $C_3$-$C_9$ dicarboxylic acids, $C_4$-$C_8$ dicarboxylic acids, $C_5$-$C_7$ dicarboxylic acids, in particular adipic acid are used as the dicarboxylic acid monomers. Especially suitable as the second monomer of the binder polymer are linear and branched, substituted and unsubstituted diamines and triamines, in particular N-(2-aminoethyl)-1,2-ethanediamine. Preferably used dialkanolamines and trialkanolamines include, for example, diethanolamine, N-alkyl-dialkanolamines such as N-methyl and N-ethyldiethanolamine and triethanolamine. For monitoring and control of the molecular weight and/or the chain length, one or more monovalent amines such as monoalkanolamines may be used during the polycondensation. Monoethanol is used preferably. The resulting intermediate product is reacted further with epichlorohydrin.

According to a preferred embodiment of the present invention, the cationic epichlorohydrin resin is a copolymer of adipic acid with N-(2-aminoethyl)-1,2-ethanediamine and epichlorohydrin.

According to one embodiment of the present invention, the at least one cationic polymer is a mixture of two or more of the aforementioned polymers. According to another embodiment of the present invention, the at least one cationic polymer consists of one of the aforementioned polymers.

According to one preferred embodiment, the at least one cationic polymer is polyDADMAC. According to another preferred embodiment, the at least one cationic polymer is a cationic starch.

The at least one cationic polymer can be provided in an aqueous form, e.g., in the form of a water-based solution, or in form of an organic solution, e.g., in an organic solvent selected from the group comprising methanol, ethanol, acetone, and mixtures thereof. However, the at least one cationic polymer also may be provided in form of an emulsion or a dispersion of water and/or organic solvents, or in form of a mixture of a solution and/or an emulsion and/or a dispersion of water and/or organic solvents.

If the at least one cationic polymer is provided in form of a solution, the solution is preferably prepared in that the at least one cationic polymer is added to a solvent, preferably water, having a temperature of at least 50° C., preferably from 50° C. to 100° C., more preferably from 60° C. to 98° C. and most preferably from 70° C. to 96° C. For example, the solution is prepared in that the at least one cationic polymer is added to water having a temperature of from 80° C. to 96° C., like from 90° C. to 96° C. Alternatively, the solution is prepared in that the at least one cationic polymer is added to a solvent, preferably water, having a temperature of below 50° C., preferably from 5° C. to 50° C., more preferably from 10° C. to 40° C. and most preferably from 15° C. to 30° C.

In one preferred embodiment, the cationic polymer solution is prepared in that the at least one cationic polymer is added to water at about room temperature, i.e. at 20° C.±2° C.

According to an alternative embodiment, the at least one cationic polymer is provided in dry form, e.g. in form of a dry powder.

In case the at least one cationic polymer is provided in the form of a dispersion, the particle size of the cationic polymer can have a $d_{50}$ value from 10 to 500 nm, preferably from 20 to 100 nm, and more preferably from 25 to 80 nm.

The cationic polymer of step d) may be provided in form of a solution or dry material, preferably in form of a solution having a concentration from 0.5 to 70 wt.-%, preferably from 1 to 25 wt.-%, more preferably from 1.5 to 20 wt.-%, and most preferably from 2 to 10 wt.-%, based on the total weight of the solution.

According to one embodiment of the present invention, the cationic polymer is added in an amount such that the charge density of the obtained self-binding pigment particles is lower compared to self-binding pigment particles not containing the cationic polymer. For example, the cationic polymer can be added in an amount such that the charge density of the obtained self-binding pigment particle is between −100 and −5 µEq/g, preferably between −80 and −10 µEq/g, and more preferably between −70 and −15 µEq/g.

According to one embodiment of the present invention, the cationic polymer of step d) is added in an amount from 0.001 to 20 wt.-%, preferably from 0.005 to 15 wt.-%, more preferably from 0.01 to 10 wt.-%, and most preferably from 0.05 to 5 wt.-% or from 0.5 to 1.5 wt.-%, based on the total weight of the dry calcium carbonate containing material.

According to a preferred embodiment of the present invention, the at least one cationic polymer of step d) is polyDADMAC, preferably added in an amount from 0.05 to 5 wt.-%, more preferably from 0.5 to 1.5 wt.-%, based on the total weight of the dry calcium carbonate containing material of step a).

According to another preferred embodiment of the present invention, the at least one cationic polymer of step d) is cationic starch, preferably added in an amount from 0.05 to 5 wt.-%, more preferably from 0.5 to 1.5 wt.-%, based on the total weight of the dry calcium carbonate containing material of step a).

According to a preferred embodiment of the present invention, the anionic binder of step c) is at least one carboxymethylcellulose, and the at least one cationic polymer of step d) is a cationic starch, wherein the binder is added in an amount from 0.01 to 20 wt.-%, preferably from 0.1 to 10 wt.-%, more preferably from 0.5 to 5 wt.-% and most preferably from 0.1 to 2.5 wt.-%, based on the total weight of the dry calcium carbonate containing material.

According to an exemplary embodiment, the anionic binder of step c) is a carboxymethylcellulose, and the at least one cationic polymer of step d) is a cationic starch, wherein the binder is added in an amount of about 0.5 wt.-%, and the cationic polymer is added in an amount of about 2.0 wt.-%, based on the total weight of the dry calcium carbonate containing material.

According to another exemplary embodiment, the calcium carbonate containing material is calcium carbonate, preferably precipitated calcium carbonate, the anionic binder of step c) is a carboxymethylcellulose, and the at least one cationic polymer of step d) is a cationic starch, wherein the binder is added in an amount of about 0.5 wt.-%, and the cationic polymer is added in an amount of about 2.0 wt.-%, based on the total weight of the dry calcium carbonate containing material.

According to still another exemplary embodiment, the calcium carbonate containing material is calcium carbonate, preferably precipitated calcium carbonate, the at least one acid or acid salt of step b) is trisodium citrate, the anionic binder of step c) is a carboxymethylcellulose, and the at least one cationic polymer of step d) is a cationic starch, wherein the acid or acid salt is added in an amount of about 0.09 wt.-%, the binder is added in an amount of about 0.5 wt.-%, and the cationic polymer is added in an amount of about 2.0 wt.-%, based on the total weight of the dry calcium carbonate containing material.

Step e)

In step e) of the process according to the present invention the aqueous suspension of step a) is mixed with the at least one acid or acid salt of step b).

The inventors of the present invention surprisingly found that the addition of an acid or acid salt to the aqueous suspension of step a) can improve the properties of the self-binding particles. For example the use of at least one acid or acid salt may lead to self-binding pigment particles with improved properties. For example, such self-binding pigment particles show an improved binding to the fibres in paper when used as filler.

Without being bound to any theory it is believed that the improved binding to the fibres is based on the interaction boundaries between the calcium carbonate containing pigment particles and the fibres.

The addition of an acid or acid salt to the aqueous suspension of step a) modifies the surface of the calcium carbonate containing material particles, and can be especially advantageous for precipitated calcium carbonate particles. PCC particles have many tips on their outer surface and, thus, are relatively rough. It is believed that these tips can interlock with paper fibres during paper production processes, resulting in an improved binding between the particles and the fibres. However, the precipitated calcium carbonate particles can release $Ca^{2+}$-ions from the inner particle core over time, and, therefore, decreased interaction boundaries between the pigment particles and fibres can be the result.

Surprisingly, the inventors have found that a way to overcome this problem is the treatment of the aqueous suspension of the calcium carbonate containing material with acids or acid salts. Without being bound to any theory, it is believed that during the treatment of the precipitated calcium carbonate particles with acid or acid salt, water insoluble calcium-salts are formed, which may inhibit the release of $Ca^{2+}$-ions from the precipitated calcium carbonate particles. As a result, the binding between the precipitated calcium carbonate pigment particles and the fibres of the paper can be improved since the tips of the precipitated calcium carbonate pigment particles are no longer "degraded" or "dissolved" by the calcium release. This may allow inter alia to increase the filler load in the paper while maintaining the mechanical strength properties of the paper.

According to one embodiment of the inventive process, the at least one acid or acid salt is added to the aqueous suspension of step a). According to another embodiment of the inventive process the aqueous suspension of step a) is added to the at least one acid or acid salt.

According to one embodiment of the inventive process, the at least one acid or acid salt is added in form of a suspension or solution to the aqueous suspension of step a). According to another embodiment of the inventive process, the at least one acid or acid salt is added in form of a solid to the aqueous suspension of step a). For example, the acid or acid salt can be added in form of a powder or granulate.

According to one embodiment of the inventive process the at least one acid or acid salt and the aqueous suspension of step a) are mixed under shear. According to another embodiment of the inventive process the shear is agitated after mixing the acid or acid salt and the aqueous suspension of step a). Shear is introduced, e.g., by stirring or shaking.

The mixing may be carried out under mixing and/or homogenizing conditions. The skilled person will adapt these mixing and/or homogenizing conditions such as the mixing speed and temperature according to his process equipment. For example, the mixing and homogenizing may take place by means of a ploughshare mixer. Ploughshare mixers function by the principle of a fluidized bed produced mechanically. Ploughshare blades rotate close to the inside wall of a horizontal cylindrical drum and convey the components of the mixture out of the product bed and into the open mixing space. The fluidized bed produced mechanically ensures intense mixing of even large batches in a very short time. Choppers and/or dispersers are used to disperse lumps in a dry operation. Equipment that may be used in the inventive process is available, for example, from Gebruder Lodige Maschinenbau GmbH, Germany or from Silverson (U.S.A.). Furthermore, a tubular mixing apparatus, for example, from Ystral GmbH, Ballrechten-Dottingen, Germany may be used. Another equipment type that may be used in the inventive process is a MEGATRON® Inline homogenizer from Kinematika AG, Switzerland.

According to one embodiment of the present invention, process step e) is carried out using a fluidized bed mixer or ploughshare mixer.

The process step e) may be carried out at room temperature, i.e. at 20° C.±2° C., or at other temperatures. According to one embodiment the process step e) is carried out at a temperature from 5 to 140° C., preferably from 10 to 110° C., and most preferably from 20 to 105° C. Heat may be introduced by internal shear or by an external source or a combination thereof.

According to an exemplary embodiment of the invention, the suspension of step a) and/or the at least one acid or acid salt of step b) is preheated before these components are mixed in process step e).

According to one embodiment of the present invention, process step e) is carried out for at least 1 s, preferably for at least 1 min, e.g., for at least 15 min, 30 min, 1 hour, 2 hours, 4 hours, 6 hours, 8 hours, or 10 hours.

According to one embodiment of the inventive process the suspension obtained in step e) is used without any further treatment in step f). According to another embodiment of the inventive process the suspension obtained in step e) is up-concentrated before step f).

The solids content of the suspension can be adjusted by the methods known to the skilled person. To adjust the solids content of the suspension obtained in step e), the suspension may be partially or fully dewatered by a filtration, centrifugation or thermal separation process. For example, the suspensions may be partially or fully dewatered by a filtration process such as nanofiltration or a thermal separation process such as an evaporation process. Alternatively, water may be added to the suspension (e.g. resulting from filtration) until the desired solids content is obtained. Additionally or alternatively, a self-binding pigment particle suspension having an appropriate lower content of solid particles may be added to the particulate material of the mixed suspension until the desired solid content is obtained.

According to one embodiment of the inventive process the suspension obtained by step e) has a solid content from 2 to 99 wt.-%, preferably from 10 to 60 wt.-%, more preferably from 15 to 45 wt.-%, and most preferably from 20 to 30 wt.-%, based on the total weight of the suspension.

Step f)

In step f) of the process according to the present invention the aqueous suspension obtained by step e) is mixed with the anionic polymeric binder of step c) and the at least one cationic polymer of step d).

According to another embodiment of the inventive process the suspension obtained in step e) is up-concentrated before step f). The up-concentration can be carried out by using thermal and/or mechanical methods well known to the skilled person.

According to one embodiment of the inventive process the suspension obtained by step e) is, in a first step, mixed with the anionic polymeric binder of step c), and then, in a second step, is mixed with the at least one cationic polymer of step d).

According to one embodiment of the inventive process the suspension obtained by step e) is, in a first step, mixed with the at least one cationic polymer of step d), and then, in a second step, is mixed with the anionic polymeric binder of step c).

According to another embodiment of the inventive process the suspension obtained by step e) is mixed with the anionic polymeric binder of step c) and the at least one cationic polymer of step d) in one step.

According to one exemplary embodiment of the present invention, in a first step, the suspension obtained by step e) is mixed with the anionic polymeric binder of step c), wherein said binder is provided in form of a solution, and then, in a second step, the at least one cationic polymer of step d) is added to the suspension in form of a dry powder.

According to another exemplary embodiment of the present invention, in a first step, the at least one cationic polymer of step d) is mixed with the anionic polymeric binder of step c) to form a premixed solution, wherein the cationic polymer and the binder are provided in form of a solution, and then, in a second step, the premixed solution is mixed with the suspension obtained by step e).

According to another exemplary embodiment of the present invention, in a first step, the suspension obtained by step e) is mixed with the anionic polymeric binder of step c), and then, in a second step, the mixed suspension is added to the at least one cationic polymer of step d), wherein the cationic polymer is in form of a solution. The solution of the cationic polymer may also contain pulp fibres to be used in papermaking processes. According to one embodiment of the present invention, the self-binding pigment particles are produced in situ during a paper making process, wherein, in a first step, the suspension obtained by step e) is mixed with the anionic polymeric binder of step c), and then, in a second step, the mixed suspension is added to the cationic polymer of step d), wherein the at least one cationic polymer is in form of a suspension containing pulp fibres.

The mixing step f) may be carried out under mixing and/or homogenizing conditions. The skilled person will adapt these mixing and/or homogenizing conditions such as the mixing speed and temperature according to his process equipment. For example, the mixing and homogenizing may take place by means of a ploughshare mixer. Ploughshare mixers function by the principle of a fluidized bed produced mechanically. Ploughshare blades rotate close to the inside wall of a horizontal cylindrical drum and convey the components of the mixture out of the product bed and into the open mixing space. The fluidized bed produced mechanically ensures intense mixing of even large batches in a very short time. Choppers and/or dispersers are used to disperse lumps in a dry operation. Equipment that may be used in the inventive process is available, for example, from Gebruder Lodige Maschinenbau GmbH, Germany or from Silverson (U.S.A.). Furthermore, a tubular mixing apparatus, for example, from Ystral GmbH, Ballrechten-Dottingen, Germany may be used. Another equipment type that may be used in the inventive process is a MEGATRON® Inline homogenizer from Kinematika AG, Switzerland.

According to one embodiment of the present invention, process step f) is carried out using a fluidized bed mixer or ploughshare mixer.

The process step f) may be carried out at room temperature, i.e. at 20° C.±2° C., or at other temperatures. According to one embodiment the process step f) is carried out at a temperature from 5 to 140° C., preferably from 10 to 110° C., and most preferably from 20 to 105° C. Heat may be introduced by internal shear or by an external source or a combination thereof.

According to an exemplary embodiment of the invention, the suspension obtained by step e) and/or the anionic polymeric binder of step c) and/or the at least one cationic polymer of step d) are mixed in process step f) and afterwards are heated to a temperature from 50 to 120° C., or from 60 to 110° C., or preferably from 70 to 105° C. for about 30 minutes, or preferably for about 60 minutes.

According to one embodiment of the present invention, process step f) is carried out for at least 1 s, preferably for at least 1 min, e.g., for at least 15 min, 30 min, 1 hour, 2 hours, 4 hours, 6 hours, 8 hours, or 10 hours.

To ensure a better dispersion, a dispersant may also be added to any of the components used in the inventive process, e.g., in the form of an aqueous solution and/or a powder of a dispersant. A suitable dispersant is preferably selected from the group comprising homopolymers or copolymers of polycarboxylic acid salts based on, for example, acrylic acid, methacrylic acid, maleic acid, fumaric acid or itaconic acid and acrylamide or mixtures thereof. Homopolymers or copolymers of acrylic acid are especially preferred. The weight average molecular weight $M_w$ of such products is preferably in the range from 2 000 to 15 000 g/mol, with a weight average molecular weight $M_w$ from 3 000 to 7 000 g/mol or 3 500 to 6 000 g/mol being especially preferred. According to an exemplary embodiment, the dispersant is sodium polyacrylate having a weight average molecular weight $M_w$ from 2 000 to 15 000 g/mol, preferably from 3 000 to 7 000 g/mol, and most preferably from 3 500 to 6 000 g/mol.

According to a preferred embodiment, no dispersant is added in process step f).

The mixing step may be carried out at a high solid content, i.e. at a solid content from 50 to 80 wt.-%, based on the total weight of the suspension. However, the mixing step can be carried out at a solid content of more than 80 wt.-%, based on the total weight of the suspension, e.g. by using a ploughshare mixer.

The solids content of the suspension can be adjusted by the methods known to the skilled person. To adjust the solids content of an aqueous suspension, the suspension may be partially or fully dewatered by a filtration, centrifugation or thermal separation process. For example, the suspensions may be partially or fully dewatered by a filtration process such as nanofiltration or a thermal separation process such as an evaporation process. Alternatively, water may be added to the solid material (e.g. resulting from filtration) until the desired solids content is obtained. Additionally or alternatively, a self-binding pigment particle suspension or other pigment particle suspension having an appropriate lower content of solid particles may be added to the particulate material of the mixed suspension until the desired solid content is obtained. The additionally added self-binding pigment particle suspension or other pigment particles suspensions can be dispersed or undispersed.

According to one embodiment of the present invention, the solids content of the mixed suspension of step f) is adjusted so that it is from 10 to 80 wt.-%, more preferably from 20 to 70 wt.-%, most preferably from 40 to 65 wt.-%, based on the total weight of the suspension.

According to a preferred embodiment of the present invention, the solid content of the mixed suspension of step f) is adjusted to a high solid content so that it is from 50 to 80 wt.-%, more preferably from 60 to 79 wt.-%, most preferably from 65 to 78 wt.-%, based on the total weight of the suspension.

Further, Optional Process Steps

According to an optional embodiment of the present invention, the process further comprises a step of concentrating the suspension of self-binding pigment particles obtained by the process of the present invention.

The solids content of the obtained self-binding pigment particle suspension can be adjusted by concentrating methods known to the skilled person. The concentrating of the corresponding pigment material suspension may be achieved by means of a thermal process, for example in an evaporator, or by means of a mechanical process, for example in a filter press such as nanofiltration, and/or centrifuge.

The solid content of the self-binding pigment particle suspension obtained by the process of the present invention can be concentrated so that it is from 10 to 80 wt.-%, more preferably from 20 to 70 wt.-%, most preferably from 40 to 60 wt.-%, based on the total weight of the suspension. According to one preferred embodiment, the solid content of the obtained self-binding pigment particle suspension is concentrated to a medium solid content so that it is from 50 to 60 wt.-%. Alternatively, the solid content of the obtained self-binding pigment particle suspension can be concentrated to a high solid content so that it is from 50 to 80 wt.-%, more preferably from 60 to 79 wt.-%, most preferably from 65 to 78 wt.-%, based on the total weight of the suspension.

According to one optional embodiment of the present invention, the step of concentrating the self-binding particle suspension obtained by the process of the present invention is carried out such that a dry product is obtained. The term "dry product" is understood to refer to pigment particles having a total surface moisture content of less than 0.5 wt.-%, preferably less than 0.2 wt.-% and more preferably less than 0.1 wt.-%, based on the total weight of the pigment particles.

If the inventive process further comprises the optional step of concentrating the obtained self-binding pigment particle suspension such that a dry product or a suspension having a solids content of at least 65 wt.-%, more preferably at least 80 wt.-% and most preferably at least 90 wt.-%, based on the total weight of the self-binding pigment particle suspension, is obtained, the dry product or the suspension may be rediluted. If the dry product or the suspension is rediluted, the solids content in the obtained suspension is adjusted such that it is at least 1 wt.-%, preferably from 1 wt.-% to 80 wt.-%, more preferably from 5 wt.-% to 60 wt.-%, even more preferably from 10 wt.-% to 50 wt.-%, and most preferably from 15 wt.-% to 45 wt.-%, based on the total weight of the self-binding pigment particle suspension.

In one preferred embodiment of the present invention, the process of the present invention may lead directly to high solids suspension of self-binding pigment particles, i.e. to a suspension having a solid content from 50 to 80 wt.-%, based on the total weight of the self-binding pigment particle suspension, which means that an additional concentration step is not implemented in the process of the present invention.

The Self-binding Pigment Particle Suspension

According to a further aspect, the present invention provides a self-binding pigment particle suspension which is obtainable by the process according to the present invention.

The inventive self-binding pigment particles can have a specific surface area of from 0.1 to 200 m$^2$/g, preferably from 1 to 25 m$^2$/g, more preferably from 2 to 15 m$^2$/g, and most preferably from 3 to 12 m$^2$/g, measured using nitrogen and the BET method according to ISO 9277:2010.

According to a further aspect of the present invention, the self-binding pigment particle suspension obtainable by the inventive process is used in paper, plastics, paint, coatings, concrete and/or agriculture applications. For example, the inventive particle suspension can be employed as filler material in these applications.

According to an exemplary embodiment of the present invention, the self-binding particle suspension obtainable by the inventive process is used in paper, e.g., in wet end process of a paper machine, preferably in cigarette paper, board and/or coating applications, or preferably as support for rotogravure and/or offset and/or ink jet printing and/or continuous ink jet printing and/or flexography and/or electrophotography and/or decoration surfaces.

Another application is the coating of tree leaves and/or plant leaves to reduce sun light and UV exposure of the leaf surface.

According to a further aspect of the present invention, a paper product comprising the inventive self-binding pigment particles is provided, wherein the pigment particles comprise calcium carbonate containing material particles which are at least partially coated with an water-insoluble calcium salt formed from an acid or acid salt, an anionic polymeric binder comprising at least one modified polysaccharide, and at least one cationic polymer.

According to one embodiment the paper comprising the inventive self-binding pigment particles has a higher tensile index compared to a paper product, wherein the inventive self-binding pigment particles are replaced by the same amount of calcium carbonate containing material particles. According to one embodiment of the present invention, preferably the tensile index is at least 5% higher, more preferably at least 7% higher, and most preferably at least 10% higher compared to the tensile index of a paper product, wherein the inventive self-binding pigment particles are replaced by the same amount of calcium carbonate containing material particles, and wherein the tensile index was determined according to ISO 1924-2:2008. In a preferred embodiment the inventive self-binding pigment particles as filler material have a tensile index of at least 20 Nm/g, preferably at least 22 Nm/g at a filler loading of 20 wt.-%, based on the total weight of the paper product.

It is to be understood that the advantageous embodiments described above with respect to the inventive method for making self-binding pigment particles also can be used for preparing or defining the inventive suspension and its use. In other words, the preferred embodiments described above and any combinations of these embodiments can also be applied to the inventive suspension and its use.

The scope and interest of the invention will be better understood based on the following figures and examples which are intended to illustrate certain embodiments of the invention and are non-limitative.

EXAMPLES

1. Measurement Methods

Figure 1:
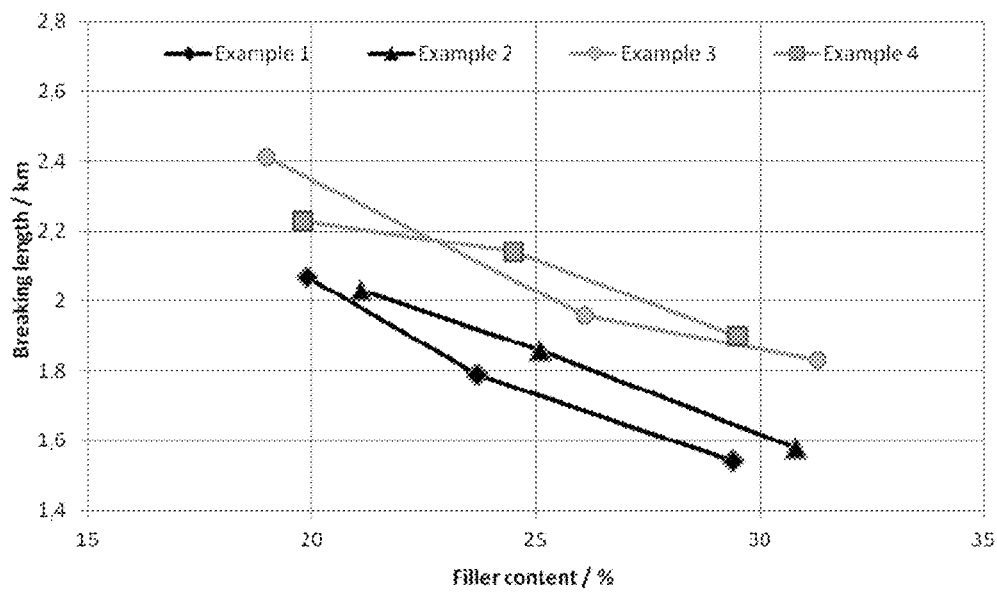
FIG. 1 shows a diagram wherein the breaking length of the tested handsheets is plotted against the filler content.

In the following, materials and measurement methods implemented in the examples are described.

BET Surface Area

The specific surface area was measured via the BET (Brunauer, St., Emmett, P. H., Teller, E. (1938): Adsorption of Gases in Multimolecular Layers, J. Am. Chem. Soc., 60, 309.) method according to ISO 9277:2010 using nitrogen, following conditioning of the sample by heating at 250° C. for a period of 30 minutes. Prior to such measurements, the sample was filtered within a Büchner funnel, rinsed with deionised water and dried overnight at 90 to 100° C. in an oven. Subsequently the dry cake was ground thoroughly in a mortar and the resulting powder placed in a moisture balance at 130° C. until a constant weight is reached.

Particle Size

The particle distribution of the calcium carbonate containing material particles was measured using a Sedigraph 5120 from the company Micromeritics, USA. The method and the instrument are known to the skilled person and are commonly used to determine grain size of fillers and pigments. The measurement was carried out in an aqueous solution comprising 0.1 wt.-% $Na_4P_2O_7$. The samples were dispersed using a high speed stirrer and supersonics.

Solids Content of an Aqueous Suspension

The suspension solids content (also known as "dry weight") was determined using a Moisture Analyser HR73 from the company Mettler-Toledo, Switzerland, with the following settings: temperature of 120° C., automatic switch off 3, standard drying, 5 to 20 g of suspension.

Intrinsic Viscosity

The intrinsic viscosity was determined by a Schott AVS 370 system. The samples were dissolved in a 0.2 M NaCl solution, and subsequently, the pH was adjusted to 10 with NaOH. Measurements were performed at 25° C. with a capillary type Oa and corrected using the Hagenbach correction.

Degree of Carboxylation

The degree of carboxylation was determined by conductometric titration according to Katz et al. "The determination of strong and weak acidic groups in sulfite pulps" (Svensk Paperstidn., 1984, 6, pp. 48-53).

2. Examples

Example 1

Comparative Example

A precipitated scalenohedral calcium carbonate (S-PCC) (commercially available as slurry with a solid content of 13 wt.-% from Omya, Switzerland) having a fineness corresponding to a $d_{50}$ value of 2.5 µm, a $d_{95}$ of 5 µm, a $d_{30}$ of 2 µm and a specific surface area of 3.4 $m^2$ $g^{-1}$ was employed as calcium carbonate containing material.

Example 2

Comparative Example

A precipitated scalenohedral calcium carbonate (S-PCC) (commercially available as slurry with a solid content of 13 wt.-% from Omya, Switzerland) having a fineness corresponding to a $d_{50}$ value of 2.5 µm, a $d_{95}$ of 5 µm, a $d_{30}$ of 2 µm and a specific surface area of 3.4 $m^2$ $g^{-1}$ was employed as calcium carbonate containing material. Trisodium citrate (commercially available from Sigma Aldrich) was employed as acid, and two different carboxymethylcelluloses (CMC) (commercially available from Mare Austria GmbH) having a molecular weight of 60 000 g/mol (Niklacell T10G) and of 200 000 g/mol (Niklacell CH90F) were employed as anionic binder. The intrinsic viscosity of the CMCs was 168 ml/g (Niklacell T10G) and 298 ml/g (Niklacell CH90F), and the degree of substitution was 0.8 for both.

The PCC was used in the form of a suspension having a solids content of 13 wt.-%. 0.09 wt.-% trisodium citrate, based on the total amount of the dry PCC, was added to said slurry in a first step and, afterwards, 0.2 wt.-% Niklacell T10G and 0.28 wt.-% Niklacell CH90F, based on the total amount of the dry PCC, were added to said slurry in a second step, wherein the sodium citrate was added in form of a solution in water having a concentration of 35 wt.-% sodium citrate, based on the total weight of the solution, and the CMC was added in form of an aqueous solution containing 6 wt.-% CMC, based on the total amount of the solution.

Example 3

Inventive Example 2 wt.-% cationic starch (C*Bond HR 35845, commercially available from Cargill Deutschland GmbH, Germany), based on the total amount of the dry PCC, was added as cationic polymer to the suspension obtained in Example 2 in form of a powder and, afterwards, the suspension was heated to 100° C. and stirred for 60 min. During the treatment, the solid content was kept at 50 wt.-%, based on the total weight of the suspension. The suspension was cooled to room temperature.

Example 4

Inventive Example 2 wt.-% cationic starch (C*Bond HR 35845, commercially available from Cargill Deutschland GmbH, Germany), based on the total amount of dry PCC in the fibrous suspension, was added to a fibre suspension of Eucalyptus pulp (Jarilyptus) and, afterwards, the suspension obtained in Example 2 was added. The starch was prepared by cooking the starch at 100° C. in water having a concentration of 1.5 wt.-%, based on total weight of the suspension. Sheets were formed and tested as described below.

Testing of Mechanical Strength Properties of Wood Free, Uncoated Paper containing the Surface-Modified Precipitated Calcium Carbonate Particles of Example 3 and 4 as Filler Eucalyptus pulp (Jarilyptus) refined to 30° SR was used as pulp. The surface modified precipitated calcium carbonate particles of Examples 3 and 4 were used as fillers. In addition, a precipitated scalenohedral calcium carbonate (S-PCC) (commercially available as slurry with a solid content of 13 wt.-% from Omya, Switzerland) was employed having a fineness corresponding to a $d_{50}$ value of 2.5 µm, a $d_{95}$ of 5 µm, a $d_{30}$ of 2 µm and a specific surface area of 3.4 $m^2$ $g^{-1}$ and Examples 1 and 2 were used as Comparative Examples. The fillers were diluted with water to a concentration of 10 wt.-%, based on the total amount of the suspension, and deagglomerated with a high speed stirrer (Kinematica, Switzerland).

60 g (dry) pulp were diluted in 10 $dm^3$ tap water, and then the filler to be tested was added in an amount so as to obtain the overall filler content based on the final paper weight. The suspension was stirred for 30 minutes. Subsequently, 0.06% (based on dry weight) of a polyacrylamide (Polymin 1530, commercially available from BASF, Ludwigshafen, Germany) was added as a retention aid and sheets of 78 g/$m^2$ were formed using the Rapid-Kö hand sheet former. Each sheet was dried using the Rapid-Kö then drier.

The filler content in the handsheets was determined by burning a quarter of a dry handsheet in a muffle furnace heated to 570° C. After the burning was completed, the residue was transferred in a desiccator and allowed to cool down. When room temperature was reached, the weight of the residue was measured and the mass was related to the initially measured weight of the dry quarter hand sheet. The filler content in the examples was 18% to 32%.

The mechanical strength properties of the handsheets were characterized after drying of the handsheets by the breaking length according to ISO 1924-2:2008, the tensile index according to ISO 1924-2:2008, the tensile energy absorption according to ISO 1924-2:2008, and the internal bond (z-direction), also referred to as scott bond, according to SCAN-P80:98/TAPPI T541.

Figure 2:
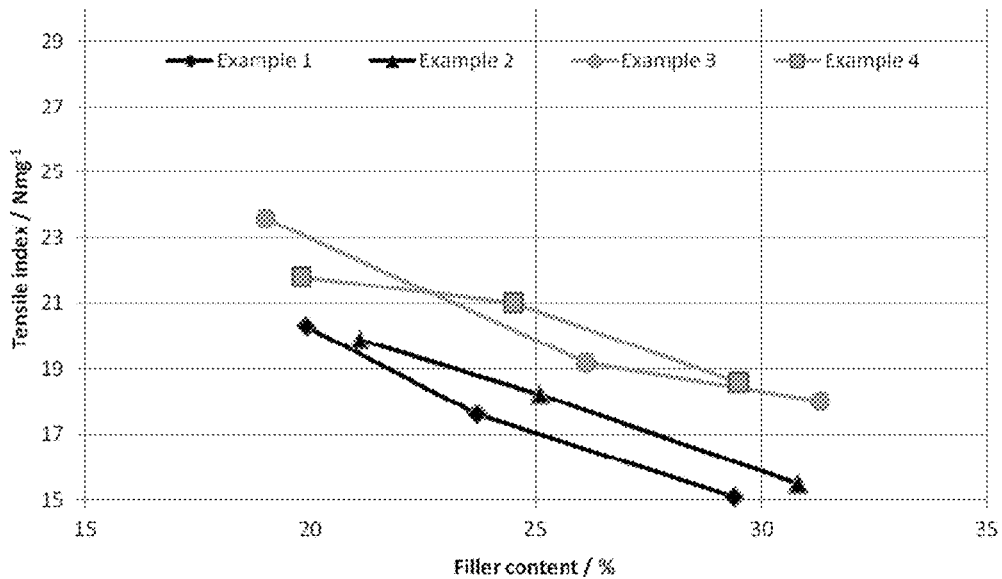
FIG. 2 shows a diagram wherein the tensile index of the tested handsheets is plotted against the filler content.
Figure 3:
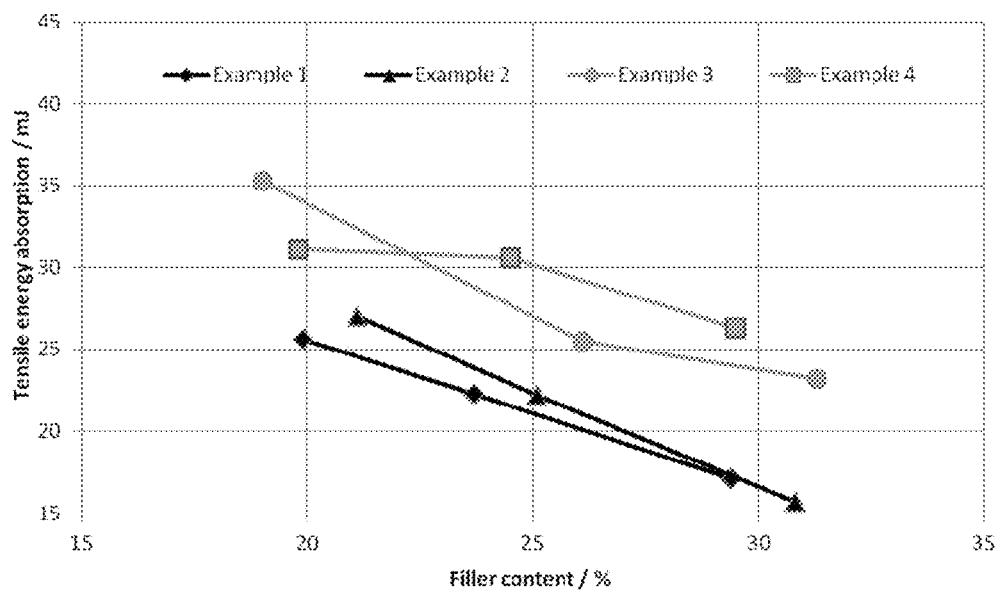
FIG. 3 shows a diagram wherein the tensile energy adsorption of the tested handsheets is plotted against the filler content.
Figure 4:
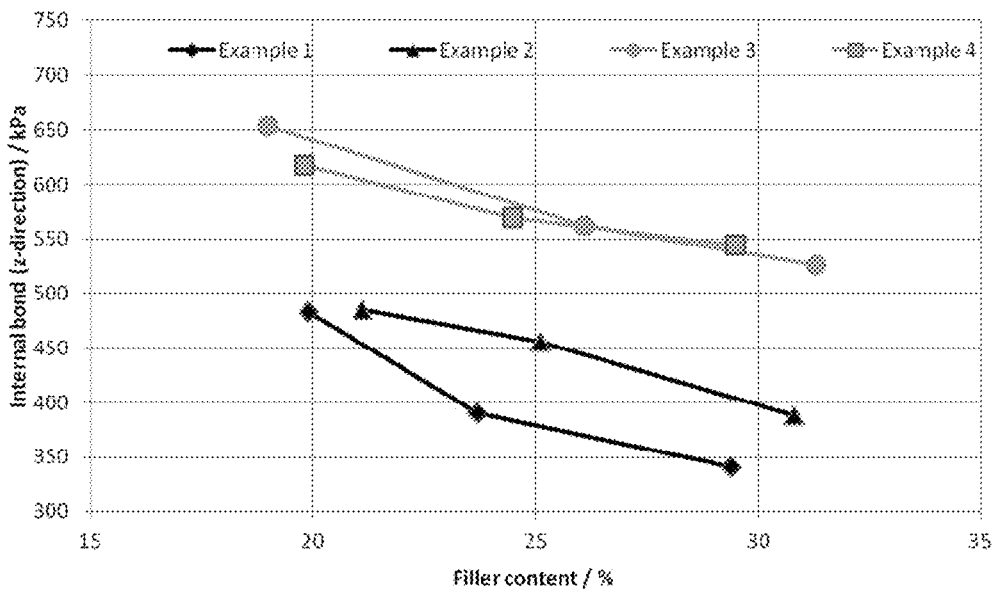
FIG. 4 shows a diagram wherein the Scott bond, also referred to as internal bond in z-direction of the tested handsheets is plotted against the filler content.

FIGS. 1 to 4 show the mechanical properties of the tested handsheets. The data show that the use of the surface-modified particles of the present invention allows an increase in the filler load from about 20% to about 27% i.e. by about 7% without affecting the mechanical strength properties of the paper. In the case of the internal bond (FIG. 4), the effect is even stronger, such that even higher filler contents would be possible.

The invention claimed is:

1. A self-binding pigment particle suspension obtained by the process comprising the following steps:
  a) providing an aqueous suspension comprising at least one calcium carbonate containing material,
  b) providing at least one acid or acid salt in an amount from 0.001 to 40 wt.-% based on the total weight of the dry calcium carbonate containing material, wherein the anion of the acid or acid salt is capable of forming water-insoluble calcium salts, and wherein the at least one acid or acid salt of step b) is selected from the group consisting of citric acid, oxalic acid, phosphoric acid, arsenic acid, iodic acid, acid salts thereof, and any mixture thereof,
  c) providing an anionic polymeric binder in an amount from 0.001 to 20 wt.-% based on the total weight of the dry calcium carbonate containing material, wherein the binder comprises at least one modified polysaccharide,
  d) providing at least one cationic polymer in an amount from 0.001 to 20 wt.-% based on the total weight of the dry calcium carbonate containing material,
  e) mixing the aqueous suspension of step a) with the at least one acid or acid salt of step b) to obtain a suspension of calcium carbonate containing material that is at least partially coated with a water-insoluble calcium salt formed from the anion of the acid or the acid salt, and
  f) mixing the suspension of step e), the anionic polymeric binder of step c) and the at least one cationic polymer of step d) to obtain an aqueous suspension of self-binding pigment particles, wherein the self-binding pigment particles so obtained comprise calcium carbonate containing material which is at least partially coated with a water-insoluble calcium salt formed from the anion of the acid or acid salt, the anionic binder comprising the at least one modified polysaccharide, and the at least one cationic polymer.

2. The suspension of claim 1, wherein in step f) the suspension obtained by step e) is, in a first step, mixed with the anionic polymeric binder of step c), and then, in a second step, is mixed with the at least one cationic polymer of step d).

3. The suspension of claim 1, wherein in step f) the suspension obtained by step e) is mixed with the anionic polymeric binder of step c) and the at least one cationic polymer of step d) in one step.

4. The suspension of claim 1, wherein in step f) the suspension obtained by step e) is, in a first step, mixed with the at least one cationic polymer of step d), and then, in a second step, is mixed with the anionic polymeric binder of step c).

5. The suspension of claim 1, wherein the suspension obtained by step e) is concentrated before step f).

6. The suspension of claim 1, wherein the at least one calcium carbonate containing material is selected from the group consisting of calcium carbonate, calcium carbonate containing minerals, mixed calcium carbonate based fillers, and any mixture thereof.

7. The suspension of claim 1, wherein the at least one calcium carbonate containing material is precipitated calcium carbonate (PCC).

8. The suspension of claim 7, wherein the PCC is scalenohedral PCC (S-PCC), rhombohedral PCC (R-PCC), prismatic PCC (P-PCC), cubic PCC (C-PCC), or any mixture thereof.

9. The suspension of claim 1, wherein the at least one calcium carbonate containing material of step a) is provided in form of particles having a weight median particle diameter $d_{50}$ value from 0.1 to 100 µm.

10. The suspension of claim 1, wherein the at least one calcium carbonate containing material of step a) is provided in form of particles having a specific surface area from 0.1 to 200 $m^2$/g.

11. The suspension of claim 1, wherein the aqueous suspension of step a) has a solid content from 10 to 70 wt.-%, based on the total weight of the suspension.

12. The suspension of claim 1, wherein the suspension of step a) further comprises talc, kaolin, $TiO_2$, bentonite or any mixture thereof.

13. The suspension of claim 1, wherein the at least one acid or acid salt of step b) is added in an amount from 0.005 to 20 wt.-%, based on the total weight of the dry calcium carbonate containing material.

14. The suspension of claim 1, wherein the at least one acid or acid salt of step b) is selected from the group consisting of citric acid, oxalic acid, phosphoric acid, acid salts thereof, and any mixture thereof.

15. The suspension of claim 1, wherein the at least one acid or acid salt of step b) is an acid salt comprising at least one non-hydrogen cation that is sodium.

16. The suspension of claim 1, wherein the at least one acid or acid salt of step b) is an acid salt selected from the group consisting of sodium dihydrogen citrate, potassium dihydrogen citrate, disodium hydrogen citrate, dipotassium hydrogen citrate, trisodium citrate, tripotassium citrate, disodium oxalate, dipotassium oxalate, magnesium oxalate sodium dihydrogen phosphate, potassium dihydrogen phosphate, disodium hydrogen phosphate, dipotassium hydrogen phosphate, trisodium phosphate and tripotassium phosphate.

17. The suspension of claim 1, wherein the at least one acid or acid salt of step b) is trisodium citrate.

18. The suspension of claim 1, wherein the suspension obtained by step e) has a solid content from 2 to 60 wt.-%, based on the total weight of the suspension.

19. The suspension of claim 1, wherein the at least one modified polysaccharide is a carboxymethyl derivate, a carboxymethyl hydroxypropyl derivate, a carboxymethyl hydroxyethyl derivate of a polysaccharide, a carboxymethylcellulose, an anionic guar, an anionic starch, xanthan gum, or any mixture thereof.

20. The suspension of claim 1, wherein the at least one modified polysaccharide has a degree of substitution of the hydroxyl groups in the range from 0.4 to 2.0.

21. The suspension of claim 1, wherein the at least one modified polysaccharide has a degree of substitution of the hydroxyl groups in the range from 0.7 to 1.5.

22. The product of claim 1, wherein the intrinsic viscosity of the at least one modified polysaccharide is in the range from 5 to 500 ml/g.

23. The product of claim 1, wherein the binder of step c) is in form of an aqueous solution or dry material.

24. The suspension of claim 1, wherein the binder of step c) is in form of an aqueous solution having a binder concentration from 1 to 70 wt.-%, based on the total weight of the solution.

25. The suspension of claim 1, wherein the binder of step c) is added in an amount from 0.005 to 15 wt.-%, based on the total weight of the dry calcium carbonate containing material.

26. The suspension of claim 1, wherein the at least one cationic polymer of step d) is selected from the group consisting of polyethyleneimines, polyacrylamides, cationic epichlorohydrin resins, cationic starch, cationic guar, and any mixture thereof.

27. The suspension of claim 1, wherein the at least one cationic polymer of step d) is in form of a solution or dry material.

28. The suspension of claim 1, wherein the at least one cationic polymer of step d) is in form of a solution having a concentration from 0.5 to 70 wt.-%, based on the total weight of the solution.

29. The suspension of claim 1, wherein the at least one cationic polymer of step d) is added in an amount from 0.005 to 15 wt.-%, based on the total weight of the dry calcium carbonate containing material.

30. A product comprising the suspension of claim 1, a concentrated suspension thereof, or self-binding particles obtained from drying the suspension.

31. Paper, paint, plastic, coating, concrete or agriculture product comprising the product of claim 30.

32. A paper product comprising self-binding pigment particles, wherein the pigment particles comprise calcium carbonate containing material which is at least partially coated with a water-insoluble calcium salt formed from an anion of an acid or acid salt, an anionic binder comprising at least one modified polysaccharide, and at least one cationic polymer, and wherein the acid or acid salt is selected from the group consisting of citric acid, oxalic acid, phosphoric acid, arsenic acid, iodic acid, acid salts thereof, and any mixture thereof.

* * * * *